006F# United States Patent Office 3,392,881
Patented July 16, 1968

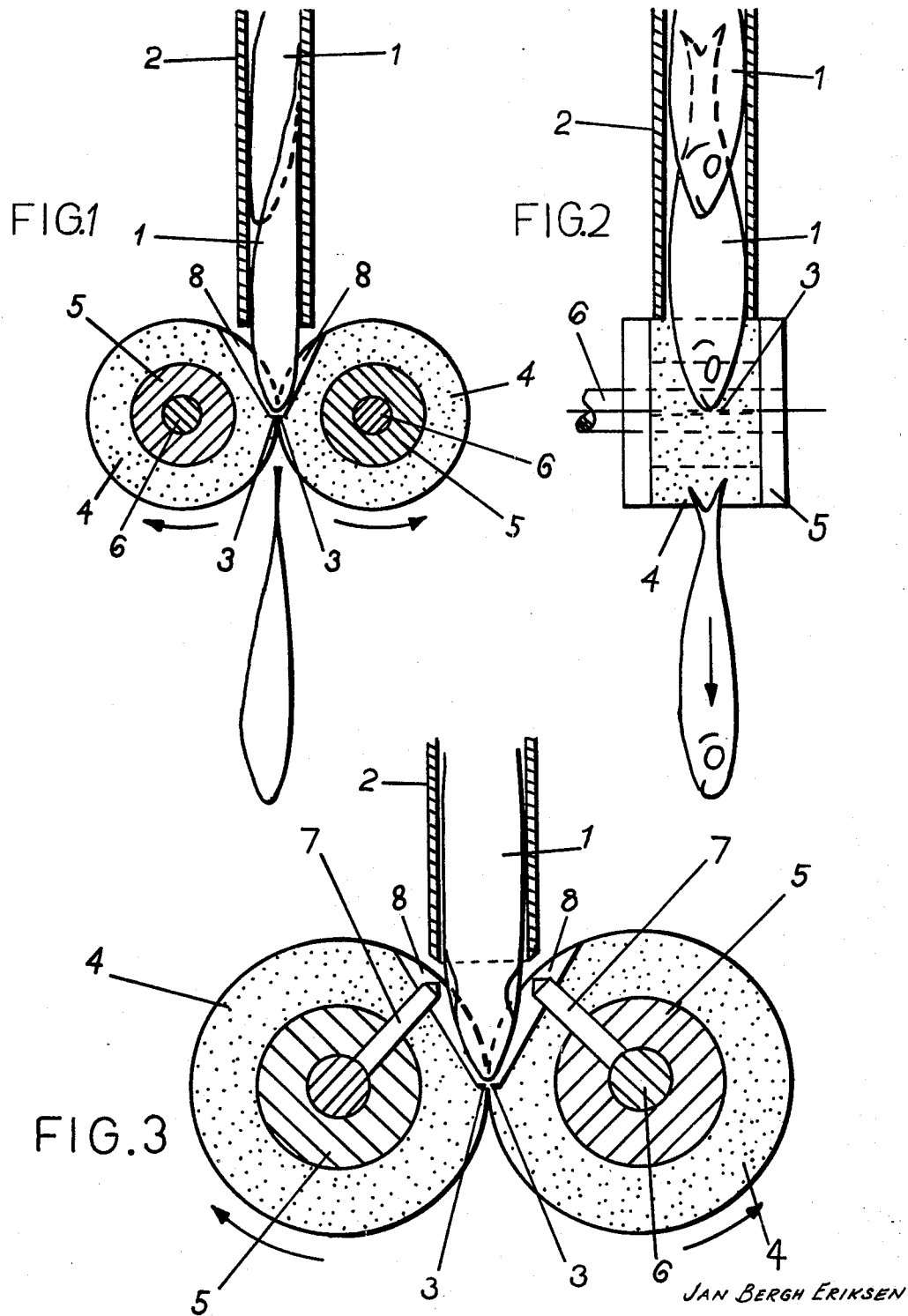

3,392,881
DEVICE FOR DISPENSING FISH
Jan Bergh Eriksen, Bronngaten 43,
Stavanger, Norway
Continuation-in-part of application Ser. No. 565,427,
July 15, 1966. This application Oct. 13, 1967, Ser.
No. 683,061
Claims priority, application Norway, Aug. 12, 1965,
159,325
1 Claim. (Cl. 221—213)

ABSTRACT OF THE DISCLOSURE

Apparatus for dispensing fish one at a time from a chute comprises a pair of opposed rollers with parallel axes and peripheral surfaces of sponge rubber. The sponge rubber surfaces have opposed cut-away pockets with at least one gripping spike disposed in each pocket to aid in the reception and transfer of fishes one by one.

This application is a continuation-in-part of my copending application Ser. No. 565,427, filed July 15, 1966 now abandoned.

This invention relates to a device for dispensing fish one at a time, which are fed into the device head first, comprising two coordinating, synchronously driven rollers with parallel axes.

In devices of this type, the fish is subjected to great pressure when passing through between the rollers and on account of the varying thickness and slipperiness of the fish, it is not possible to achieve a dispensing with exact intervals between the dispensed fish.

The purpose of this invention is to furnish a device for reliable and gentle dispensing of fish one at a time, at exact time intervals.

This is achieved according to the invention by the rollers being intermittently driven and consisting of, or being fitted with, an outer tire section of elastically yielding material, for example foam rubber, these rollers, on the periphery, having a cut-away section, or pocket, which forms the gripping surface for the head of the fish.

In order to ensure an exact beginning point for the fish before it is gripped by the gripping surfaces, a further feature of this invention is that the pocket has approximately the shape of a circle segment with a nose in front reckoned in the direction of rotation of the roller, and flush with the circumference of the circle. In this manner, the head of the fish will come to rest against the nose before the dispensing takes places between the rollers.

To prevent the slipperiness of the fish affecting the moment of attack of the gripping surfaces, a further feature of the invention is that the gripping surface is fitted with at least one gripping spike.

Two examples of the device, according to the invention, will be explained below with reference to the drawings.

FIGURE 1 shows a section of a device according to the invention shown in the direction in which the fish is dispensed.

FIGURE 2 shows the device in FIG. 1, in section also in the fish-dispensing direction, but 90° compared to the section in FIG. 1.

FIGURE 3 shows in the same manner as FIG. 1 a different embodiment of the rollers.

In the examples, the fish 1 is fed head first through a tube or a channel 2 with the help of vibration or gravity. In front of the mouth of this tube there are arranged two coordinating, synchronous and intermittently driven rollers 5 with parallel axes 6. The rollers 5 are fitted with an outer tire section 4 of foam rubber. The tire sections 4 have a cut-away part, or pocket, 8 in the shape of a circle segment with a nose 3 in front reckoned in the direction of rotation of the rollers flush with the circumference of the circle. The pockets 8 form the gripping surface for the fish's head and the nose acts as a stopper for the fish's head before the gripping surfaces come into action.

The example in FIG. 3 is like the example in FIG. 1, except that in the gripping surfaces there has been fitted a gripping spike 7 to ensure that the time intervals for the dispensing of the fish shall be exact and not influenced by the slipperiness of the fish when attacked by the gripping surfaces alone.

At the same time, the soft elastic material of tire section 4 which covers the rollers 5 of the present invention cooperates with these spikes 7: as the pockets 8 turn away from each other to discharge the fish, the elastic material of the pockets, which has been to some extent compressed, springs back and moves relative to the spikes 7, so as to overcome any tendency of the fish to cling to the dispenser. In other words, the dispenser is self-ejecting by virtue of the combination of the spikes 7 and the soft elastic material of the tire sections 4 on the periphery of the rollers 5.

Having described my invention, I claim:

1. A device for dispensing fish one at a time which are fed into the device head first, comprising two rollers with parallel axes synchronously driven in opposite directions, each roller having an outer peripheral tire surface of soft elastically yielding material, the rollers having on their circumferences at least one pocket that is opposed to a corresponding pocket on the other roller, each pocket having approximately the shape of a circle segment with a nose in front with respect to the direction of rotation of the roller and flush with the circumference of the outer tire surface, and at least one gripping spike extending outwardly and disposed within each pocket so that the gripping spikes of the two rollers are opposed to each other.

References Cited

UNITED STATES PATENTS

| 479,688 | 7/1892 | Weller | 221—259 |
| 1,452,721 | 4/1923 | Antoine | 221—266 |
| 2,167,049 | 7/1939 | Maurath et al. | 221—259 X |
| 3,065,879 | 11/1962 | Jennings et al. | 221—266 X |
| 3,105,609 | 10/1963 | Salfisberg | 221—224 X |

WALTER SOBIN, *Primary Examiner.*